US009145485B2

(12) United States Patent
Okada et al.

(10) Patent No.: US 9,145,485 B2
(45) Date of Patent: Sep. 29, 2015

(54) RUBBER COMPOSITION AND PROCESS FOR PRODUCTION THEREOF, AND TIRE

(75) Inventors: Koji Okada, Tokyo (JP); Ryoji Tanaka, Tokyo (JP); Yoshiyuki Udagawa, Tokyo (JP)

(73) Assignee: JSR CORPORATION, Tokyo (JP)

( * ) Notice: Subject to any disclaimer, the term of this patent is extended or adjusted under 35 U.S.C. 154(b) by 0 days.

(21) Appl. No.: 13/821,764

(22) PCT Filed: Aug. 10, 2011

(86) PCT No.: PCT/JP2011/068253
§ 371 (c)(1),
(2), (4) Date: Mar. 8, 2013

(87) PCT Pub. No.: WO2012/032895
PCT Pub. Date: Mar. 15, 2012

(65) Prior Publication Data
US 2013/0172481 A1     Jul. 4, 2013

(30) Foreign Application Priority Data
Sep. 8, 2010   (JP) ................................. 2010-201265

(51) Int. Cl.
    *C08K 3/04*      (2006.01)
    *C08K 3/36*      (2006.01)
    *C08K 5/548*      (2006.01)
    *B60C 1/00*      (2006.01)
    *C08C 19/44*      (2006.01)

(52) U.S. Cl.
CPC ................. *C08K 3/36* (2013.01); *B60C 1/0016* (2013.04); *C08C 19/44* (2013.01); *C08K 5/548* (2013.01); *Y02T 10/862* (2013.01)
USPC ..... 524/575; 524/572; 525/331.9; 525/332.9; 525/333.1; 525/333.2; 525/350; 525/374

(58) Field of Classification Search
USPC ......... 524/572, 575; 525/331.9, 332.9, 333.1, 525/333.2, 350, 374
See application file for complete search history.

(56) References Cited

U.S. PATENT DOCUMENTS

| | | | | |
|---|---|---|---|---|
| 4,431,755 | A * | 2/1984 | Weber et al. ................... | 523/203 |
| 6,433,065 | B1 | 8/2002 | Lin et al. | |
| 6,608,145 | B1 | 8/2003 | Lin et al. | |
| 7,342,070 | B2 | 3/2008 | Tsukimawashi et al. | |
| 2005/0209370 | A1* | 9/2005 | Zhang et al. ................... | 523/333 |
| 2007/0149648 | A1* | 6/2007 | Yagi et al. ..................... | 523/200 |

FOREIGN PATENT DOCUMENTS

| | | |
|---|---|---|
| CN | 1578790 A | 2/2005 |
| CN | 1990531 A | 7/2007 |
| EP | 1 462 459 A1 | 9/2004 |
| EP | 2 075 278 A1 | 7/2009 |
| JP | 2003 155380 | 5/2003 |
| JP | 2003 155398 | 5/2003 |
| JP | 2004 511598 | 4/2004 |
| JP | 2004 511600 | 4/2004 |
| JP | 2006 282964 | 10/2006 |
| JP | 2007 277437 | 10/2007 |
| JP | 2007 284482 | 11/2007 |
| JP | 2007-284645 | * 11/2007 |
| JP | 2007 284645 | 11/2007 |
| JP | 2007-284645 A | 11/2007 |
| JP | 2008 101158 | 5/2008 |
| JP | 2009 167238 | 7/2009 |
| JP | 2009 269981 | 11/2009 |

OTHER PUBLICATIONS

International Search Report Issued Nov. 29, 2011 in PCT/JP11/68253 Filed Aug. 10, 2011.
U.S. Appl. No. 14/007,156, filed Sep. 24, 2013, Okada, et al.
U.S. Appl. No. 13/985,471, filed Aug. 14, 2013, Okada, et al.
Extended European Search Report issued on Jul. 11, 2014 in the corresponding European Application No. 11823374.1.
Japanese Office Action issued Dec. 26, 2014, in corresponding Japanese Patent Application 2012-532914 (with English-language Translation).

* cited by examiner

*Primary Examiner* — Robert Harlan
(74) *Attorney, Agent, or Firm* — Oblon, McClelland, Maier & Neustadt, L.L.P.

(57) ABSTRACT

A rubber composition that can be used in applications such as automotive tires and can improve the fuel efficiency performance and driving stability of automobiles and the like, a method for producing a rubber composition, and a tire using the same are provided.
A rubber composition comprising: (A) a conjugated diene rubber which is obtained by polymerizing a conjugated diene compound or polymerizing a conjugated diene compound and an aromatic vinyl compound and has a group having an active hydrogen and a group capable of chemically binding to a silica, (B) a silica, (C) a silane coupling agent (I) capable of reacting with a carbon-carbon double bond of the conjugated diene in the conjugated diene rubber, and (D) a silane coupling agent (II) capable of reacting with the group having an active hydrogen; a method for producing a rubber composition, which comprises mixing the above-mentioned composition; and a tire which is obtained by crosslinking and molding the rubber composition obtained by the method for production.

11 Claims, No Drawings

RUBBER COMPOSITION AND PROCESS FOR PRODUCTION THEREOF, AND TIRE

CROSS-REFERENCE TO RELATED APPLICATIONS

This application is a National Stage of PCT/JP2011/068253 filed on Oct. 8, 2011. This application is based upon and claims the benefit of priority to Japanese Application No. 2010-201265 filed on Aug. 9, 2010.

TECHNICAL FIELD

The present invention relates to a rubber composition for tire tread, which improves fuel efficiency performance and driving stability of an vehicle, a method for producing the rubber composition, and a tire using the same.

BACKGROUND ART

Conjugated diene rubbers (for example, styrene-butadiene copolymers) obtained by emulsion polymerization methods are known as rubbers for automotive tires. A variety of conjugated diene rubbers that can realize an excellent fuel efficiency performance have been introduced in recent years with the expectations for improved automotive fuel efficiency performance.

As an example, a conjugated diolefin (co)polymer rubber with the following characteristics (1) to (3) and a rubber composition containing the conjugated diolefin (co)polymer rubber have been proposed: (1) it is a (co)polymer rubber of a conjugated diolefin or a conjugated diolefin and an aromatic vinyl compound; (2) it has a primary amino group and an alkoxysilyl group bound to the (co)polymer chain; and (3) a monomer having two or more functionalities is copolymerized in the (co)polymer chain, and/or, at least a portion of the (co)polymer chain is coupled with a coupling agent having two or more functionalities. (Patent Document 1).

As another example, a modified diene polymer rubber and a rubber composition containing the modified diene polymer rubber have been proposed wherein the modified diene polymer rubber is obtained from a step 1 of obtaining an active polymer having an alkali metal terminal by polymerizing a conjugated diene monomer or polymerizing a conjugated diene monomer and an aromatic vinyl monomer in a hydrocarbon solvent in the presence of an alkali metal catalyst and a step 2 of obtaining a modified polymer rubber by reacting the active polymer with a compound represented by a specific formula (Patent Document 2).

Moreover, as a method for producing a modified polymer that has an increased interaction with a silica and carbon black and that can provide improved failure characteristics, abrasion resistance, and low heat build-up performance, a method of performing a primary modification reaction, in which a hydrocarbyloxysilane compound is reacted with the active site of a polymer that has an organometal active site in the molecule, and subsequently performing a secondary modification reaction, in which a hydrocarbyloxysilane compound is reacted via a condensation reaction between hydrocarbyloxysilyl groups each other (Patent Document 3).

BACKGROUND ART DOCUMENTS

Patent Documents

Patent Document 1: JP-A-2004-18795
Patent Document 2: JP-A-2005-290355
Patent Document 3: WO 03/048216 A1

SUMMARY OF THE INVENTION

Problems that the Invention is to Solve

As noted above, a variety of conjugated diene rubbers that can realize an excellent automotive fuel efficiency performance and rubber compositions using the conjugated diene rubbers have been proposed. However, additional improvements in automotive fuel efficiency are anticipated in view of economic considerations such as the steep increase in gasoline prices and in view of environmental considerations starting with carbon dioxide emissions.

Accordingly, an object of the present invention is to provide a method for producing a rubber composition that can be used in applications such as automotive tires and can improve the fuel efficiency performance and the like of automobiles and the like.

Means for Solving the Problems

As a result of intensive investigations in order to solve the problems described above, the inventors of the present invention have found that excellent fuel efficiency performance and driving stability are imparted in the case where a rubber composition obtained by mixing a conjugated diene rubber modified for mixing with a silica, a silica, and specific two kinds of silane coupling agents is used as a starting material for a crosslinked rubber composition of automotive tires and the like. Thus, the present invention has been accomplished.

Namely, the present invention provides the following [1] to [12].

[1] A rubber composition comprising: (A) a conjugated diene rubber which is obtained by polymerizing a conjugated diene compound or polymerizing a conjugated diene compound and an aromatic vinyl compound and has a group having an active hydrogen and a group capable of chemically binding to a silica, (B) a silica, (C) a silane coupling agent (I) capable of reacting with a carbon-carbon double bond of the conjugated diene in the conjugated diene rubber, and (D) a silane coupling agent (II) capable of reacting with the group having an active hydrogen.

[2] A method for producing a rubber composition, which comprises mixing (A) a conjugated diene rubber which is obtained by polymerizing a conjugated diene compound or polymerizing a conjugated diene compound and an aromatic vinyl compound and has a group having an active hydrogen and a group capable of chemically binding to a silica, (B) a silica, (C) a silane coupling agent (I) capable of reacting with a carbon-carbon double bond of the conjugated diene in the conjugated diene rubber, and (D) a silane coupling agent (II) capable of reacting with the group having an active hydrogen.

[3] The method for producing a rubber composition according to [2], wherein the component (C) has at least one selected from sulfur, a carbon-carbon double bond, and a carbon-carbon triple bond in the structure thereof.

[4] The method for producing a rubber composition according to [2] or [3], wherein the group capable of reacting with the group having an active hydrogen in the component (D) has at least one selected from an epoxy group, a methacryloyloxy group, an acryloyloxy group, a carboxyl group, an isocyanate group, an aldehyde group, and an acyl group.

[5] The method for producing a rubber composition according to any one of [2] to [4], wherein the group having an active hydrogen in the component (A) is at least one

[6] The method for producing a rubber composition according [5], wherein the component (A) further has at least one selected from a tertiary amino group, a tertiary phosphino group, and a pyridyl group.

[7] The method for producing a rubber composition according to [6], wherein the component (A) has an onium structure formed from at least one selected from a primary amino group, a secondary amino group, a tertiary amino group, an imino group, a pyridyl group, a primary phosphino group, a secondary phosphino group, a tertiary phosphino group, and a thiol group.

[8] The method for producing a rubber composition according to any one of [2] to [7], wherein the group capable of chemically binding to a silica in the component (A) is a hydrocarbyloxysilyl group or a silanol group.

[9] The method for producing a rubber composition according to any one of [2] to [8], wherein the component (C) is at least one selected from compounds represented by the following formulae (1-a) to (1-c):

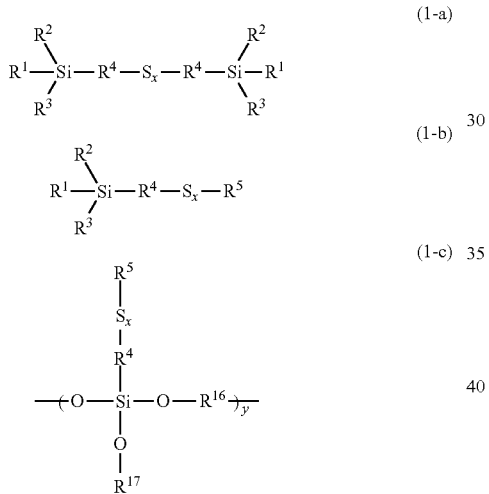

wherein $R^1$ and $R^2$ are the same or different from each other and are a group represented by $R^{10}O—$ or an alkylpolyether group represented by the formula $—O—(R^{11}—O)_n—R^{12}$, wherein $R^{10}$ is a hydrogen atom, a monovalent hydrocarbon group having 1 to 30 carbon atoms, or a group represented by $(R^{13})_3SiR^{14}—$ wherein $R^{13}$ is an alkyl group or alkenyl group having 1 to 30 carbon atoms; and $R^{14}$ is a divalent hydrocarbon group having 1 to 30 carbon atoms; in the case where plurality of $R^{11}$ groups are present, the $R^{11}$ groups are the same or different from each other and are a divalent hydrocarbon group having 1 to 30 carbon atoms; n is from 1 to 30 in average; $R^{12}$ is a monovalent hydrocarbon group having at least 3 carbon atoms;

in the case where plurality of $R^3$ groups are present, the $R^3$ groups are the same or different from each other and are a group represented by $R^{10}O—$ or a monovalent hydrocarbon group having 1 to 30 carbon atoms and $R^{10}$ is the same as mentioned above;

in the case where plurality of $R^4$ groups are present, the $R^4$ groups are the same or different from each other and are a divalent hydrocarbon group having 1 to 30 carbon atoms;

$R^5$ is a hydrogen atom, a monovalent hydrocarbon group having 1 to 30 carbon atoms, a group represented by —CN, or a group represented by $—(C=O)—R^{15}$, wherein $R^{15}$ is a monovalent hydrocarbon group having 1 to 30 carbon atoms;

$R^{16}$ is a group represented by the formula $—(R^{18}—O)_p—R^{19}$, where in the case where plurality of $R^{18}$ groups and $R^{19}$ groups are present, the $R^{18}$ groups and $R^{19}$ groups are the same or different from each other, respectively, and are a divalent hydrocarbon group having 1 to 12 carbon atoms; p is from 0 to 30 in average;

$R^{17}$ is a monovalent hydrocarbon group having 1 to 12 carbon atoms, a formula $—(R^{20}—O)_q—H$, or a binding group $—(R^{21}—O)_{q-1}—R^{22}—$ obtained by dehydrative condensation of $—(R^{20}—O)_q—H$ wherein in the case where plurality of $R^{20}$ groups and $R^{21}$ groups are present, the $R^{20}$ groups and $R^{21}$ groups are the same or different from each other, respectively, and are a divalent hydrocarbon group having 1 to 12 carbon atoms; $R^{22}$ is a divalent hydrocarbon group having 1 to 12 carbon atoms; q is from 1 to 30 in average; x is an integer of 1 to 20; and y is an integer of 5 to 10,000.

[10] The method for producing a rubber composition according to any one of [2] to [9], wherein the component (D) is a compound represented by the following formula (2):

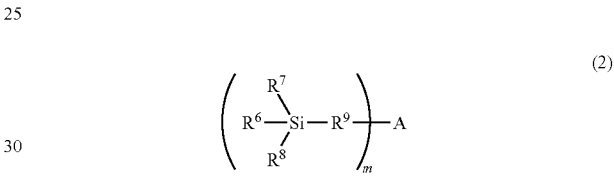

wherein $R^6$ and $R^7$ are the same or different from each other and has the same structure as that of $R^1$ and $R^2$ in the above formulae (1-a) and (1-b);

in the case where plurality of $R^8$ groups are present, the $R^8$ groups are the same or different from each other and have the same structure as that of $R^3$ in the above formulae (1-a) and (1-b);

in the case where plurality of $R^9$ groups are present, the $R^9$ groups are the same or different from each other and have the same structure as that of $R^4$ in the above formulae (1-a) and (1-b);

m is an integer of 1 or 2; and

A has one or more functional group structures selected from an epoxy group, a methacryloyloxy group, an acryloyloxy group, a carboxyl group, an isocyanate group, an aldehyde group, and an acyl group.

[11] A rubber composition obtained by the method for production according to any one of [2] to [10].

[12] A tire obtained by crosslinking and molding the rubber composition according to [11].

Effect of the Invention

According to the present invention, a rubber composition obtained by mixing a conjugated diene rubber modified for mixing with a silica, a silica, and specific two kinds of silane coupling agents can produce a crosslinked rubber composition that exhibits improved dispersibility of a silica and is excellent in tensile strength, abrasion resistance, wet skid resistance, and low hysteresis character.

The crosslinked rubber composition produced using the conjugated diene rubber is excellent in wet skid resistance and hence can improve driving stability of automobiles and the like by using the composition in the applications such as automotive tires.

Moreover, the crosslinked rubber composition produced by using the conjugated diene rubber is excellent in abrasion resistance and low hysteresis character and hence can improve the fuel efficiency performance of automobiles and the like by using the composition in the applications such as automotive tires.

MODE FOR CARRYING OUT THE INVENTION

The rubber composition of the present invention comprises (A) a conjugated diene rubber which is obtained by polymerizing a conjugated diene compound or polymerizing a conjugated diene compound and an aromatic vinyl compound and has a group having an active hydrogen and a group capable of chemically binding to a silica, (B) a silica, (C) a silane coupling agent (I) capable of reacting with a carbon-carbon double bond of the conjugated diene in the conjugated diene rubber, and (D) a silane coupling agent (II) capable of reacting with the group having an active hydrogen. In this connection, the rubber composition of the present invention is a concept including both of the mode before the reaction of respective components constituting the composition and the mode after the reaction.

The following will describe the components in detail.

[Component (A)]

The component (A) for use in the present invention is a conjugated diene rubber, which is obtained by introducing a group capable of chemically binding to a silica into a polymer obtained by polymerizing a conjugated diene compound singly or polymerizing a conjugated diene compound and an aromatic vinyl compound, in order to increase adhesiveness with a silica. More specifically, the component is a conjugated diene rubber (hereinafter sometimes referred to as "modified rubber for a silica") which is obtained by polymerizing a conjugated diene compound or polymerizing a conjugated diene compound and an aromatic vinyl compound and has a group having an active hydrogen and a group capable of chemically binding to a silica.

The modified rubber for a silica is preferably obtained by introducing a functional group into a conjugated diene rubber obtained by solution polymerization. Examples of the conjugated diene rubber include styrene-butadiene copolymer rubber, acrylonitrile-styrene-butadiene copolymer rubber, butadiene rubber, isoprene rubber, butadiene-isoprene copolymer rubber, butadiene-styrene-isoprene copolymer rubber, natural rubber, acrylonitrile-butadiene rubber, chloroprene rubber, and the like and preferably include styrene-butadiene copolymer rubber and butadiene rubber. They can be used singly or two or more thereof may be used in combination. Moreover, since the modified rubber for a silica is easy of control of molecular weight distribution, a low-molecular-weight component which may cause deterioration of rolling resistance can be removed. Furthermore, for the reason of easy introduction of a functional group, a conjugated diene rubber obtained by living polymerization is desirable.

In the case where styrene is contained as a material for the modified rubber for a silica, the styrene unit content is preferably 40% by mass or less. When the styrene unit content exceeds 40% by mass, the rolling resistance tends to become worse.

The vinyl content in the conjugated diene portion of the modified rubber for a silica is preferably from 15 to 70% by mass. When the vinyl content is less than 15% by mass, a balance between grip at wet and rolling resistance tends to become worse. Moreover, when the vinyl content exceeds 70% by mass, there is a tendency that the abrasion resistance remarkably becomes worse.

Examples of the group having an active hydrogen, which is introduced into the modified rubber for a silica, include nitrogen-containing groups such as an amino group, sulfur-containing groups such as a thiol group, phosphorus-containing groups such as a phosphino group, a hydroxyl group, a carboxyl group, and the like. From the viewpoint of reactivity with the silane coupling agent, the group is preferably at least one selected from a primary amino group, a secondary amino group, an imino group, a primary phosphino group, a secondary phosphino group, and a thiol group.

The group having an active hydrogen is capable of reacting with the silane coupling agent (II) which is the component (D) to be mentioned later.

Examples of the group capable of chemically binding to a silica (including a covalent bond, a hydrogen bond, and interaction through molecular polarity), which is introduced into the modified rubber for a silica, include nitrogen-containing groups such as an amino group, sulfur-containing groups such as a thiol group, silicone-containing groups such as a hydrocarbylsilyl group, hydrocarbyloxysilyl group, and a silanol group, phosphorus-containing groups such as a phosphino group, a hydroxyl group, an epoxy group (for example, an oxiranyl group, an oxetanyl group, etc.), a hydrocarbyloxy group, a carboxyl group, and the like. Since a chemical binding to a silica is particularly excellent and the rolling resistance of a tire composed of the resulting rubber composition is sufficiently reduced, one or more functional groups selected from a primary amino group, a secondary amino group, a tertiary amino group, a thiol group, a primary phosphino group, a secondary phosphino group, a tertiary phosphino group, a pyridyl group, a hydroxyl group, an epoxy group, a carboxylic acid group, a thioepoxy group, a hydrocarbylthio group, a hydrocarbyloxy group, and a hydrocarbyloxysilyl group are preferable. One or more functional groups selected from a primary amino group, a secondary amino group, a tertiary amino group, a thiol group, a hydrocarbylthio group, and a hydrocarbyloxysilyl group are more preferable.

The group having an active hydrogen and the group capable of chemically binding to a silica, both of which are contained in the modified rubber for a silica, may be the same kind of group. Moreover, the number of the group having an active hydrogen and the group capable of chemically binding to a silica, both of which are contained in the modified rubber for a silica, is not particularly limited and plurality of the same kind of functional groups may be present and those having plural kinds of functional groups in combination (for example, at least one selected from a primary amino group, a secondary amino group, an imino group, a primary phosphino group, a secondary phosphino group, and a thiol group as the group having an active hydrogen and a hydrocarbyloxysilyl group or a silanol group as the group capable of chemically binding to a silica) are preferable. Furthermore, although the position of the functional group is not particularly defined and may be any of inside of the molecule, molecular end, or side chain of the molecule, those having a functional group only at the molecular end of the conjugated diene rubber are preferable.

For the introduction of the functional group, it is preferable to react a compound having an objective functional group (the group having an active hydrogen and the group capable of chemically binding to a silica) with a conjugated diene polymer and, from the standpoint of reaction probability, it is preferable to react them at living polymerization. Moreover, it is also preferable to use a functional group-containing monomer which has living polymerizability with the monomer constituting the conjugated diene polymer.

Examples of the compound having an objective functional group include compounds having at least one selected from a primary amino group, a secondary amino group, an imino group, a primary phosphino group, a secondary phosphino group, and a thiol group as the group having an active hydrogen and at least one selected from a primary amino group, a secondary amino group, a tertiary amino group, a thiol group, a hydrocarbylthio group, and a hydrocarbyloxysilyl group as the group capable of chemically binding to a silica. Of these, from the standpoint of easy handling (storage stability etc.), compounds having at least one selected from a primary amino group, a secondary amino group, an imino group, a primary phosphino group, a secondary phosphino group, and a thiol group and a hydrocarbyloxysilyl group are more preferable.

Specifically, examples thereof include N,N-bis(trimethylsilyl)aminopropylmethyldimethoxysilane, N,N-bis(trimethylsilyl)aminopropyltrimethoxysilane, N,N-bis(trimethylsilyl)aminopropyltriethoxysilane, N,N-bis(trimethylsilyl)aminopropylmethyldiethoxysilane, N,N-bis(trimethylsilyl)aminoethyltrimethoxysilane, N,N-bis(trimethylsilyl)aminoethyltriethoxysilane, N,N-bis(trimethylsilyl)aminoethylmethyldimethoxysilane, N,N-bis(trimethylsilyl)aminoethylmethyldiethoxysilane, N,N-bis(triethylsilyl)aminopropylmethyldimethoxysilane, N,N-bis(triethylsilyl)aminopropyltrimethoxysilane, N,N-bis(triethylsilyl)aminopropyltriethoxysilane, N,N-bis(triethylsilyl)aminopropylmethyldiethoxysilane, N,N-bis(triethylsilyl)aminopropyldimethylmethoxysilane, N,N-bis(triethylsilyl)aminopropyldimethylethoxysilane, N,N-bis(triethylsilyl)aminoethyltrimethoxysilane, N,N-bis(triethylsilyl)aminoethyltriethoxysilane, N,N-bis(triethylsilyl)aminoethylmethyldimethoxysilane, N,N-bis(triethylsilyl)aminoethylmethyldiethoxysilane, N,N-bis(t-butyldimethylsilyl)aminopropyltrimethoxysilane, N,N-bis(t-butyldimethylsilyl)aminopropyltriethoxysilane, N,N-bis(t-butyldimethylsilyl)aminopropylmethyldimethoxysilane, N,N-bis(t-butyldimethylsilyl)aminopropylmethyldiethoxysilane, N,N-bis(t-butyldimethylsilyl)aminopropyldimethylmethoxysilane, N,N-bis(t-butyldimethylsilyl)-aminopropyldimethylethoxysilane, and, in compounds where the amino group in these aminoalkylhydrocarbyloxysilane compounds is protected with plural trialkylsilyl groups, hydrocarbyloxysilane compounds where a portion of the plural trialkylsilyl groups are replaced by a methyl group, an ethyl group, a propyl group, or a butyl group;

bis[3-(triethoxysilyl)propyl]trimethylsilylamine, bis[3-(trimethoxysilyl)propyl]trimethylsilylamine, 3-dimethylaminopropyltrimethoxysilane, 3-diethylaminopropyltrimethoxysilane, 3-dimethylaminopropyltriethoxysilane, 3-diethylaminopropyltriethoxysilane, 3-ethylmethylaminopropyltrimethoxysilane, 3-ethylmethylaminopropyltriethoxysilane, 3-dimethylaminopropylmethyldimethoxysilane, 3-diethylaminopropylmethyldimethoxysilane, 3-dimethylaminopropylethyldimethoxysilane, 3-diethylaminopropylethyldimethoxysilane, 3-dimethylaminopropyldimethylmethoxysilane, 3-dimethylaminopropyldiethylmethoxysilane, 3-diethylaminopropyldimethylmethoxysilane, 3-diethylaminopropyldiethylmethoxysilane, 3-ethylmethylaminopropylmethyldimethoxysilane, 3-methyl-3-ethylaminopropylethyldimethoxysilane, bis(3-dimethylaminopropyl)-dimethoxysilane, bis(3-ethylmethylaminopropyl)-diethoxysilane, bis-[(3-dimethylamino-3-methyl)propyl]-dimethoxsilane, bis-[(3-ethylmethylamino-3-methyl)propyl]-dimethoxsilane, 3-dimethylaminopropylmethyldiethoxysilane, 3-diethylaminopropylmethyldiethoxysilane, 3-dimethylaminopropylethyldiethoxysilane, 3-diethylaminopropylethyldiethoxysilane, 3-dimethylaminopropyldimethylethoxysilane, 3-dimethylaminopropyldiethylethoxysilane, 3-diethylaminopropyldimethylethoxysilane, 3-diethylaminopropyldiethylethoxysilane, 3-ethylmethylaminopropylmethyldiethoxysilane, 3-ethylmethylaminopropylethyldiethoxysilane, [3-(diethylamino)propyl]trimethoxysilane, [3-(dimethylamino)propyl]triethoxysilane, 3-di(methoxymethyl)aminopropyltrimethoxysilane, 3-di(methoxyethyl)aminopropyltrimethoxysilane, 3-di(methoxymethyl)aminopropyltriethoxysilane, 3-di(methoxyethyl)aminopropyltriethoxysilane, 3-di(ethoxyethyl)aminopropyltrimethoxysilane, 3-di(ethoxymethyl)aminopropyltrimethoxysilane, 3-di(ethoxyethyl)aminopropyltriethoxysilane, 3-di(ethoxymethyl)aminopropyltriethoxysilane, N-(1,3-dimethylbutylidene)-3-(triethoxysilyl)-1-propanamine, N-(1,3-methylethylidene)-3-(triethoxysilyl)-1-propanamine, N-ethylidene-3-(triethoxysilyl)-1-propanamine, N-(1-methylpropylidene)-3-(triethoxysilyl)-1-propanamine, N-(4-N,N-dimethylaminobenzylidene)-3-(triethoxysilyl)-1-propanamine, N-(cyclohexylidene)-3-(triethoxysilyl)-1-propanamine, N-(cyclohexylidene)-3-(trimethoxysilyl)-2-propanamine, N-(cyclohexylidene)-3-(methyldiethoxysilyl)-3-propanamine, and N-(cyclohexylidene)-3-(ethyldimethoxysilyl)-4-propanamine;

N,N',N'-tris(trimethylsilyl)-N-(2-aminoethyl)-3-aminopropyltriethoxysilane, N,N',N'-tris(trimethylsilyl)-N-(2-aminoethyl)-3-aminopropylmethyldiethoxysilane, N,N',N'-tris(trimethylsilyl)-N-(2-aminoethyl)-3-aminopropyltrimethoxysilane, N,N',N'-tris(trimethylsilyl)-N-(2-aminoethyl)-3-aminopropylmethyldimethoxysilane, and, in compounds where the amino group in these aminoalkylhydrocarbyloxysilane compounds is protected with plural trialkylsilyl groups, hydrocarbyloxysilane compounds where a portion of the plural trialkylsilyl groups are replaced by a methyl group, an ethyl group, a propyl group, or a butyl group;

N-[3-(trimethoxysilyl)-propyl]-N,N'-diethyl-N'-trimethylsilyl-ethane-1,2-diamine, N-[3-(triethoxysilyl)-propyl]-N,N'-diethyl-N'-trimethylsilyl-ethane-1,2-diamine, N-[3-(methyldimethoxysilyl)-propyl]-N,N'-diethyl-N'-trimethylsilyl-ethane-1,2-diamine, N-[3-(methyldimethoxysilyl)-propyl]-N,N'-diethyl-N'-trimethylsilyl-p-phenylenediamine, N-[3-(triethoxysilyl)-propyl]-N,N'-diethyl-N'-trimethylsilyl-p-phenylenediamine, N-(3-(diethoxymethylsilyl)-propyl]-N-ethyl-N'-(2-ethoxyethyl)-N'-trimethylsilyl-ethane-1,2-diamine, N-[3-(tripropoxysilyl)-propyl]-N-propyl-N'-(2-ethoxyethyl)-N'-triethylsilyl-p-phenylenediamine, N-[2-(diethoxymethylsilyl)-1-methylethyl]-N-ethyl-N'-(2-diethylamino-ethyl)-N'-triethylsilyl-ethane-1,2-diamine, N-[3-(triethoxysilyl)-propyl]-N-ethyl-N'-(2-diethylaminoethyl)-N'-triethylsilylethane-1,2-diamine, N-[2-(trimethoxysilyl)-ethyl]-N,N',N'-trimethylethane-1,2-diamine, N-[2-(dimethoxymethylsilyl)-ethyl]-N-ethyl-N'N,'-dimethylethane-1,2-diamine, N-[3-(trimethoxysilyl)-propyl]-N,N',N'-trimethylpropane-1,3-diamine, N-[3-(dimethoxymethylsilyl)-propyl]-N-ethyl-N',N'-dimethylpropane-1,3-diamine, N-[3-(triethoxysilyl)-propyl]-N,N,N'-triethyl-2-methylpropane-1,3-diamine, N-[3-(dimethoxymethylsilyl)-propyl]-2,N,N,N'-tetramethylpropane-1,3-diamine, N-(2-dimethylaminoethyl)-N'-[2-(trimethoxysilyl)-ethyl]-N,N'-dimethylethane-1,2-diamine, N-[2-(diethoxypropylsilyl)-ethyl]-N'-(3-ethoxypropyl)-N,N'-dimethylethane-1,2-diamine, N-[2-(trimethoxysilyl)- ethyl]-N'-methoxymethyl-N,N'-dimethylethane-1,2-diamine, N-[2-(trimethoxysilyl)-ethyl]-N,N'-dimethyl-N'-(2-trimethylsilylethyl)-ethane-1,2-diamine, N-[2-(triethoxysilyl)-ethyl]-N,N'-diethyl-N'-(2-dibutylmethoxysilylethyl)-ethane-1,2-diamine, N-trimethylsilyl-N-methylaminopropylmethyldiethoxysilane, 1-(3-triethoxysilylpropyl)-2,2,5,5-tetramethyl-1-aza-2,5-disilacyclopentane, 1-(3-trimethoxysilylpropyl)-2,2,5,5-tetramethyl-1-aza-2,5-disilacyclopentane, 1-(3-methyldiethoxysilylpropyl)-2,2,5,5-tetramethyl-1-aza-2,5-disilacyclopentane, 1-(3-methyldimethoxysilylpropyl)-2,2,5,5-tetramethyl-1-aza-2,5-disilacyclopentane, 1-trimethylsilyl-2,2-dimethoxy-1-aza-2-silacyclopentane, 3-[3-(trimethylsilylethylamino)-1-pyrrolidinyl)-propyl-methyldiethoxysilane, 343-(trimethylsilylpropylamino)-1-pyrrolidinyl]-propyl-triethoxysilane, 3-(4-trimethylsilyl-1-piperazino)propylmethyldimethoxysilane, 3-(4-trimethylsilyl-1-piperazino)propyltriethoxysilane, 3-(4-trimethylsilyl-1-piperazino)propyltributoxysilane, 4-(3-trimethylsilyl-1-piperazinyl)butyltriethoxysilane, 1-[3-(triethoxysilyl)-propyl]-4-methylpiperazine, 1-[3-(diethoxyethylsilyl)-propyl]-4-methylpiperazine, 3-(4-methyl-1-piperazino)propylmethyldimethoxysilane, 3-(4-methyl-1-piperazino)propyltrimethoxysilane, 3-(4-methyl-1-piperazino)propyltributoxysilane, 3-(4-ethyl-1-piperazino)propylmethyldimethoxysilane, 3-(4-ethyl-1-piperazino)propyltriethoxysilane, 3-(4-ethyl-1-piperazino)propyltrimethoxysilane, 3-(4-ethyl-1-piperazino)propyltributoxysilane, 2-(triethoxysilyl)-1,4-diethylpiperazine, 2-(dimethoxymethylsilyl)-1,4-dimethylpiperazine, 2-(3-triethoxysilyl-propyl)-1,4-diethylpiperazine, 2-(3-dimethoxymethylsilyl-propyl)-1,4-dimethylpiperazine, 3-piperidinopropyltrimethoxysilane, 3-piperidinopropyltriethoxysilane, 3-piperidinopropylmethyldimethoxysilane, 3-piperidinopropylethyldimethoxysilane, 3-piperidinopropylmethyldiethoxysilane, 3-piperidinopropylethyldiethoxysilane, 3-(3-trimethylsilyl-1-imidazolidinyl)propylethyldiethoxysilane, 3-(3-trimethylsilyl-1-imidazolidinyl)propyltriethoxysilane, 1-[3-(trimethoxysilyl)-propyl]-3-methylimidazolidine, 1-[3-(diethoxyethylsilyl)-propyl]-3-ethylimidazolidine, 1-(2-ethoxyethyl)-3-[3-(trimethoxysilyl)-propyl]imidazolidine, 2-(trimethoxysilyl)-1,3-dimethylimidazolidine, 2-(3-trimethoxysilyl-propyl)-1,3-dimethylimidazolidine, 2-(diethoxysilyl)-1,3-diethylimidazolidine, 2-[3-(2-dimethylaminoethyl)-2-(ethyldimethoxysilyl)-imidazolidin-1-yl]-ethyl-dimethylamine, 2-(3-diethoxyethylsilyl-propyl)-1,3-diethylimidazolidine, 2-[3-(2-dimethylaminoethyl)-2-(3-ethyldimethoxysilyl-propyl)-imidazolidin-1-yl]-ethyl-dimethylamine, N-(3-trimethoxysilylpropyl)-4,5-dihydroimidazole, N-(3-triethoxysilylpropyl)-4,5-dihydroimidazole, N-(3-trimethoxysilylpropyl)-4,5-imidazole, N-(3-triethoxysilylpropyl)-4,5-imidazole, 3-(3-trimethylsilyl-1-hexahydropyrimidinyl)propylmethyldimethoxysilane, 3-(3-trimethylsilyl-1-hexahydropyrimidinyl)propyltriethoxysilane, 1-[3-(triethoxysilyl)-propyl]-3-methylhexahydropyrimidine, 1-[3-(dimethoxymethylsilyl)-propyl]-3-methylhexahydropyrimidine, 3-[3-(tributoxysilyl)-propyl]-1-methyl-1,2,3,4-tetrahydropyrimidine, 3-[3-(dimethoxymethylsilyl)-propyl]-1-ethyl-1,2,3,4-tetrahydropyrimidine, 2-{3-[3-(trimethoxysilyl)-propyl]-tetrahydropyrimidin-1-yl}-ethyldimethylamine, 5-(triethoxysilyl)-1,3-dipropylhexahydropyrimidine, 5-(diethoxyethylsilyl)-1,3-diethylhexahydropyrimidine, 5-(trimethoxysilyl)-1,3-bis-(2-methoxyethyl)-hexahydropyrimidine, 5-(ethyldimethoxysilanyl)-1,3-bis-trimethylsilanylhexahydropyrimidine, 5-(3-triethoxysilyl-propyl)-1,3-dipropyl-hexahydropyrimidine, 5-(3-diethoxyethylsilyl-propyl)-1,3-diethylhexahydropyrimidine, 5-(3-trimethoxysilyl-propyl)-1,3-bis-(2-methoxyethyl)-hexahydropyrimidine, 5-(3-ethyldimethoxysilyl-propyl)-1,3-bis-(2-trimethylsilylethyl)-hexahydropyrimidine, 3-morpholinopropyltrimethoxysilane, 3-morpholinopropyltriethoxysilane, 3-morpholinopropylmethyldimethoxysilane, 3-morpholinopropylethyldimethoxysilane, 3-morpholinopropylmethyldiethoxysilane, 3-morpholinopropylethyldiethoxysilane, 3-hexamethyleneiminopropyltrimethoxysilane, 3-hexamethyleneiminopropyltriethoxysilane, 3-hexamethyleneiminopropylmethyldimethoxysilane, 3-hexamethyleneiminopropylethyldimethoxysilane, 3-hexamethyleneiminopropylmethyldiethoxysilane, 3-hexamethyleneiminopropylethyldiethoxysilane, 3-di(t-butyldimethylsilyl)aminopropyltrimethoxysilane, 3-di(t-butyldimethylsilyl)aminopropyltriethoxysilane, 3-di(t-butyldimethylsilyl)aminopropylmethyldimethoxysilane, 3-di(t-butyldimethylsilyl)aminopropylmethyldiethoxysilane, 3-di(t-butyldimethylsilyl)aminopropyldimethylmethoxysilane, 3-di(t-butyldimethylsilyl)aminopropyldimethylethoxysilane, N-(cyclohexylidene)-3-(trimethoxysilyl)-1-propanamine, N-(cyclohexylidene)-3-(methyldiethoxysilyl)-1-propanamine, N-(cyclohexylidene)-3-(ethyldimethoxysilyl)-1-propanamine, [(3-methyl-3-ethylamino)propyl]trimethoxysilane, [(3-methyl-3-ethylamino)propyl]triethoxysilane, N,O-bis(trimethylsilyl)acetamide, N-trimethylsilylbenzaldehydeimine, N-trimethylsilyl-2-oxo-pyrrolidine, bis(trimethylsilyl)carbodiimide, P,P-bis(trimethylsilyl)phosphinopropylmethyldimethoxysilane, P,P-bis(trimethylsilyl)phosphinopropyltrimethoxysilane, P,P-bis(trimethylsilyl)phosphinopropyltriethoxysilane, P,P-bis(trimethylsilyl)phosphinopropylmethyldiethoxysilane, P,P-bis(trimethylsilyl)phosphinoethyltrimethoxysilane, P,P-bis(trimethylsilyl)phosphinoethyltriethoxysilane, P,P-bis(trimethylsilyl)phosphinoethylmethyldimethoxysilane, P,P-bis(trimethylsilyl)phosphinoethylmethyldiethoxysilane, 3-dimethylphosphinopropyltrimethoxysilane, 3-diethylphosphinopropyltrimethoxysilane, 3-dimethylphosphinopropyltriethoxysilane, 3-diethylphosphinopropyltriethoxysilane, 3-ethylmethylphosphinopropyltrimethoxysilane, 3-ethylmethylphosphinopropyltriethoxysilane, 3-dimethylphosphinopropylmethyldimethoxysilane, 3-diethylphosphinopropylmethyldimethoxysilane, 3-dimethylphosphinopropylethyldimethoxysilane, 3-diethylphosphinopropylethyldimethoxysilane, 3-dimethylphosphinopropyldimethylmethoxysilane, 3-dimethylphosphinopropyldiethylmethoxysilane, 3-diethylphosphinopropyldimethylmethoxysilane, 3-diethylphosphinopropyldiethylmethoxysilane, 3-ethylmethylphosphinopropylmethyldimethoxysilane, 3-ethylmethylphosphinopropylethyldimethoxysilane, 3-dimethylphosphinopropylmethyldiethoxysilane, 3-diethylphosphinopropylmethyldiethoxysilane, 3-dimethylphosphinopropylethyldiethoxysilane, 3-diethylphosphinopropylethyldiethoxysilane, 3-dimethylphosphinopropyldimethylethoxysilane, 3-dimethylphosphinopropyldiethylethoxysilane, 3-diethylphosphinopropyldimethylethoxysilane, 3-diethylphosphinopropyldiethylethoxysilane, 3-ethylmethylphosphinopropylmethyldiethoxysilane, 3-ethylmethylphosphinopropylethyldiethoxysilane, 3-diphenylphosphinopropyltrimethoxysilane, 3-diphenylphosphinopropyltriethoxysilane, 3-diphenylphosphinopropylmethyldimethoxysilane, 3-diphenylphosphinopropylmethyldiethoxysilane, S-trimethylsilylmercaptopropylmethyldimethoxysilane, S-trimethylsilylmercaptopropyltrimethoxysilane, S-trimethylsilylmercaptopropyltriethoxysilane, S-trimethylsilylmercaptopropylmethyldiethoxysilane, S-trimethylsilylmercaptoethyltrimethoxysilane, S-trimethylsilylmercaptoethyltriethoxysilane, S-trimethylsilylmercaptoethylmethyldimethoxysilane, S-trimethylsilylmercaptoethylmethyldiethoxysilane, bis(trimethylsilyl)-sulfur-diimide, and the like.

Preferably, N,N-bis(triethylsilyl)aminopropylmethyldimethoxysilane, N,N-bis(trimethylsilyl)aminopropylmethyldimethoxysilane, N,N-bis(trimethylsilyl)aminopropylmethyldiethoxysilane, N,N-bis(trimethylsilyl)aminopropyltriethoxysilane, 1-(3-triethoxysilylpropyl)-2,2,5,5-tetramethyl-1-aza-2,5-disilacyclopentane, N,N',N'-tris(trimethylsilyl)-N-(2-aminoethyl)-3-aminopropyltriethoxysilane, 1-trimethylsilyl-2,2-dimethoxy-1-aza-2-silacyclopentane, N-[3-(trimethoxysilyl)-propyl]-N,N'-diethyl-N'-trimethylsilyl-ethane-1,2-diamine, N-[3-(triethoxysilyl)-propyl]-N,N'-diethyl-N'-trimethylsilyl-ethane-1,2-diamine, 3-(4-trimethylsilyl-1-piperazino)propyltriethoxysilane, N-[2-(trimethoxysilyl)-ethyl]-N,N',N'-trimethylethane-1,2-diamine, 1-[3-(triethoxysilyl)-propyl]-4-methylpiperazine, 2-(trimethoxysilyl)-1,3-dimethylimidazolidine, 2-(3-trimethoxysilyl-propyl)-1,3-dimethylimidazolidine, 3-dimethylaminopropyltrimethoxysilane, 3-diethylaminopropyltrimethoxysilane, 3-dimethylaminopropyltriethoxysilane, 3-diethylaminopropyltriethoxysilane, bis[3-(triethoxysilyl)propyl]trimethylsilylamine, bis[3-(trimethoxysilyl)propyl]trimethylsilylamine, N-(1,3-dimethylbutylidene)-3-(triethoxysilyl)-1-propanamine, N-(1-methylpropylidene)-3-(triethoxysilyl)-1-propanamine, N-(3-trimethoxysilylpropyl)-4,5-dihydroimidazole, N-(3-triethoxysilylpropyl)-4,5-dihydroimidazole, N-(3-trimethoxysilylpropyl)-4,5-imidazole, N-(3-triethoxysilylpropyl)-4,5-imidazole, bis-(3-dimethylaminopropyl)-dimethoxysilane, N-trimethylsilyl-N-methylaminopropylmethyldiethoxysilane, [3-(diethylamino)propyl]trimethoxysilane, [3-(dimethylamino)propyl]triethoxysilane, 3-diphenylphosphinopropyltrimethoxysilane, 3-diphenylphosphinopropyltriethoxysilane, S-trimethylsilylmercaptopropylmethyldimethoxysilane, S-trimethylsilylmercaptopropyltrimethoxysilane, S-trimethylsilylmercaptopropyltriethoxysilane, and S-trimethylsilylmercaptopropylmethyldiethoxysilane are mentioned.

Moreover, examples of the functional group-containing monomer to be used for introduction of a functional group include 1-(4-N,N-dimethylaminophenyl)-1-phenylethylene, 1-(4-N,N-diethylaminophenyl)-1-phenylethylene, 1-(4-N,N-dipropylaminophenyl)-1-phenylethylene, 1-(4-N,N-dibutylaminophenyl)-1-phenylethylene, 1-(4-N,N-dimethoxyaminophenyl)-1-phenylethylene, 1-(4-N,N-diethoxyaminophenyl)-1-phenylethylene, 1-(4-N,N-dipropoxyaminophenyl)-1-phenylethylene, 1-(4-N,N-dibutoxyaminophenyl)-1-phenylethylene, and the like. Of these, from the standpoint of a remarkable improvement of fuel saving performance, 1-(4-N,N-dimethylaminophenyl)-1-phenylethylene is preferable.

The weight-average molecular weight in terms of polystyrene determined by gel permeation chromatography (GPC) of the modified rubber for a silica before modification is preferably from 10,000 to 1,500,000, more preferably from 50,000 to 1,000,000, and particularly preferably from 100,000 to 800,000, form the standpoint of maintaining a balance between the shape stability of the modified rubber for a silica and the processability during production of the rubber composition.

The molecular weight distribution (Mw/Mn) of the modified rubber for a silica is preferably 2.3 or less and more preferably 2.2 or less. When Mw/Mn exceeds 2.3, the molecular weight distribution is broadened, i.e., low-molecular-weight components increases, so that the rolling resistance becomes worse.

Form the standpoint of maintaining a balance between the low hysteresis loss character of the resulting crosslinked rubber composition and its wet skid resistance, the glass-transition temperature of the modified rubber for a silica is preferably 0° C. or lower, more preferably −5° C. or lower, and particularly preferably −10° C. or lower.

Form the standpoint of maintaining a balance between the shape stability of the modified rubber for a silica and the processability during production of the rubber composition, the Mooney viscosity (ML1+4, 100° C.) of the modified rubber for a silica is preferably from 2 to 150 and more preferably from 5 to 120.

In the case where the modified rubber for a silica has a group capable of forming an onium structure by the action of an onium generator, the onium structure may be formed at the time point of mixing a silica and two silane coupling agents. Examples of the group capable of forming an onium structure include nitrogen-containing groups such as an amino group, phosphorus-containing groups such as a phosphino group, and sulfur-containing groups such as a thiol group. Specifically, examples thereof include a primary amino group, a secondary amino group, a tertiary amino group, an imino group, a pyridyl group, a primary phosphino group, a secondary phosphino group, a tertiary phosphino group, and a thiol group.

In the present invention, the onium structure means a structure in a cationized state formed by the addition of an excess proton to a monoatomic anion.

As the onium generator for forming the onium structure, a metal halide such as a silicon halide compound, a tin halide compound, an aluminum halide compound, a titanium halide compound, a zirconium halide compound, a germanium halide compound, a zinc halide compound, or a gallium halide compound; a sulfate ester, a phosphate ester, a carbonate ester, or a nitrate ester; a carboxylic acid or a sulfonic acid; an inorganic acid such as hydrofluoric acid, hydrochloric acid, hydrobromic acid, hydroiodic acid, sulfuric acid, nitric acid, carbonic acid, or phosphoric acid; an inorganic acid salt such as potassium fluoride, tetramethylammonium fluoride, or tetra-n-butylammonium fluoride; or an organic acid such as carboxylic acid or sulfonic acid etc. are appropriately compounded.

Specific examples of the onium generator include silicon tetrachloride, tin tetrachloride, trimethylsilyl chloride, dimethyldichlorosilane, methyltrichlorosilane, methyldichlorosilane, diethylaluminum chloride, ethylaluminum sesquichloride, ethylaluminum dichloride, titanium tetrachloride, titanocene dichloride, zirconium tetrachloride, zirconocene dichloride, germanium tetrachloride, gallium trichloride, zinc chloride, diethyl sulfate, dimethyl sulfate, magnesium laureth sulfate, trimethyl phosphate, triethyl phosphate, tributyl phosphate, 2-ethylhexyl phosphate, triphenyl phosphate, tricresyl phosphate, dimethyl carbonate, diethyl carbonate, ethylene carbonate, propylene carbonate, nitrocellulose, nitroglycerin, nitroglycol, formic acid, acetic acid, oxalic acid, maleic acid, citric acid, malic acid, fumaric acid, malonic acid, acrylic acid, crotonic acid, succinic acid, glutaric acid, itaconic acid, tartaric acid, sebacic acid, terephthalic acid, isophthalic acid, β-mercaptopropionic acid, benzenesulfonic acid, p-toluenesulfonic acid, hydrofluoric acid, hydrochloric acid, hydrobromic acid, hydroiodic acid, sulfuric acid, nitric acid, carbonic acid, phosphoric acid, potassium fluoride, tetramethylammonium fluoride, tetra-n-butylammonium fluoride, and the like.

The rubber component constituting the rubber composition of the present invention may contain, in addition to the modified rubber for a silica, other rubber components such as natural rubber, butadiene rubber, styrene-butadiene copolymer rubber, butyl rubber, acrylonitrile-styrene-butadiene copolymer rubber, isoprene rubber, butadiene-isoprene copolymer rubber, butadiene-styrene-isoprene copolymer rubber, natural rubber, acrylonitrile-butadiene rubber, chloroprene rubber, and the like. Of these, for the reason that a balance between wet grip and rolling resistance can be highly achieved with maintaining abrasion resistance, it is preferable to contain natural rubber, styrene-butadiene copolymer rubber, or butadiene rubber.

In the present invention, the rubber component is a concept including the modified rubber for a silica and the other rubber component(s).

The content of the modified rubber for a silica contained in the rubber component in the rubber composition of the present invention is 30% by mass or more, preferably 45% by mass or more, and more preferably 50% by mass or more. When the content is less than 30% by weight, it is difficult to reduce the rolling resistance.

[Component (B)]

The silica for use in the present invention is a silica commonly used as a filler and particularly, a synthetic silicic acid having a primary particle diameter of 50 nm or less is preferable. As the synthetic silica, wet silica and dry silica are preferably used.

The content of the silica is preferably from 50 to 130 parts by mass and more preferably from 60 to 120 parts by mass based on 100 parts by mass of the rubber component. When the content of the silica is less than 50 parts by mass, the rolling resistance becomes good while the abrasion resistance decreases, so that there is a tendency that it becomes difficult to maintain the driving stability. Moreover, when the content of the silica exceeds 130 parts by mass, the rolling resistance tends to become worse.

[Component (C)]

The silane coupling agent (I) capable of reacting with the carbon-carbon double bond of the conjugated diene, which is contained in the conjugated diene rubber for use in the present invention, for example, is a compound having at least one selected from sulfur, a carbon-carbon double bond, and a carbon-carbon triple bond in the structure thereof.

As the silane coupling agent (I) having sulfur in the chemical structure, at least one compound selected from the following formulae (1-a) to (1-c) is mentioned:

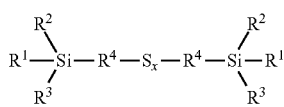 (1-a)

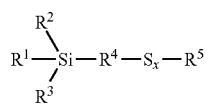 (1-b)

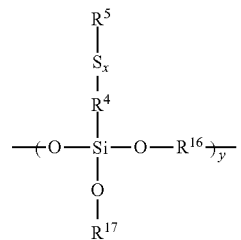 (1-c)

wherein $R^1$ and $R^2$ are the same or different from each other and are a group represented by $R^{10}O-$ or an alkylpolyether group represented by the formula $-O-(R^{11}-O)_n-R^{12}$, wherein $R^{10}$ is a hydrogen atom, a monovalent hydrocarbon group having 1 to 30 carbon atoms, or a group represented by $(R^{13})_3SiR^{14}-$, wherein the monovalent hydrocarbon group having 1 to 30 carbon atoms of $R^{10}$ is, for example, a branched or unbranched monovalent alkyl group, alkenyl group, aryl group, or aralkyl group having 1 to 30 carbon atoms; $R^{13}$ is a branched or unbranched alkyl group or alkenyl group having 1 to 30 carbon atoms; $R^{14}$ is a divalent hydrocarbon group having 1 to 30 carbon atoms, for example, a branched or unbranched divalent alkylene group, alkenylene group, arylene group, or aralkylene group having 1 to 30 carbon atoms; in the case where plurality of $R^{11}$ groups are present, the $R^{11}$ groups are the same or different from each other and are a divalent hydrocarbon group having 1 to 30 carbon atoms, for example, a branched or unbranched saturated or unsaturated aliphatic divalent hydrocarbon group having 1 to 30 carbon atoms, specifically, an alkylene group, an alkenylene group, an arylene group, or an aralkylene group; n is from 1 to 30 on average; $R^{12}$ is a monovalent hydrocarbon group having at least 3 (usually 3 to 30) carbon atoms, for example, an unsubstituted or substituted branched or unbranched monovalent alkyl group, alkenyl group, aryl group, or aralkyl group; in the case where plurality of $R^3$ groups are present, the $R^3$ groups are the same or different from each other and are a group represented by $R^{10}O-$ or a monovalent hydrocarbon group having 1 to 30 carbon atoms, for example, a branched or unbranched saturated or unsaturated aliphatic, aromatic, or mixed aliphatic/aromatic monovalent hydrocarbon group having 1 to 30 carbon atoms, specifically an alkyl group, an alkenyl group, an aryl group, or an aralkyl group, and $R^{10}$ is the same as mentioned above; in the case where plurality of $R^4$ groups are present, the $R^4$ groups are the same or different from each other and are a divalent hydrocarbon group having 1 to 30 carbon atoms, for example, a branched or unbranched saturated or unsaturated aliphatic, aromatic, or mixed aliphatic/aromatic divalent hydrocarbon group having 1 to 30 carbon atoms, specifically an alkylene group, an alkenylene group, an arylene group, or an aralkylene group; $R^5$ is a hydrogen atom, a monovalent hydrocarbon group having 1 to 30 carbon atoms, for example, a branched or unbranched saturated or unsaturated aliphatic, aromatic, or mixed aliphatic/aromatic monovalent hydrocarbon group having 1 to 30 carbon atoms, specifically an alkyl group, an alkenyl group, an aryl group, or an aralkyl group, a group represented by $-CN$, or a group represented by $-(C=O)-R^{15}$, where $R^{15}$ is a monovalent hydrocarbon group having 1 to 30 carbon atoms, for example, a branched or unbranched saturated or unsaturated aliphatic, aromatic, or mixed aliphatic/aromatic monovalent hydrocarbon group having 1 to 30 carbon atoms, specifically an alkyl group, an alkenyl group, an aryl group, or an aralkyl group; $R^{16}$ is a group represented by the formula —($R^{18}$—O)$_p$—$R^{19}$—, wherein in the case where plurality of $R^{18}$ groups and $R^{19}$ groups are present, the $R^{18}$ groups and $R^{19}$ groups are the same or different from each other, respectively, and are a divalent hydrocarbon group having 1 to 12 carbon atoms, for example, a branched or unbranched divalent alkylene group, alkenylene group, arylene group, or aralkylene group having 1 to 12 carbon atoms; p is from 0 to 30 on average; $R^{17}$ is a monovalent hydrocarbon group having 1 to 12 carbon atoms, a formula —($R^{20}$—O)$_q$—H, or a binding group —($R^{21}$—O)$_{q-1}$—$R^{22}$— obtained by dehydrative condensation of —($R^{20}$—O)$_q$—H, wherein the monovalent hydrocarbon group having 1 to 12 carbon atoms of $R^{17}$ is, for example, a branched or unbranched monovalent alkyl group, alkenyl group, aryl group, or aralkyl group having 1 to 12 carbon atoms; in the case where plurality of $R^{20}$ groups and $R^{21}$ groups are present, the $R^{20}$ groups and $R^{21}$ groups are the same or different from each other, respectively, and are a divalent hydrocarbon group having 1 to 12 carbon atoms, for example, a branched or unbranched divalent alkylene group, alkenylene group, arylene group, or aralkylene group having 1 to 12 carbon atoms; $R^{22}$ is a divalent hydrocarbon group having 1 to 12 carbon atoms, for example, a branched or unbranched divalent alkylene group, alkenylene group, arylene group, or aralkylene group having 1 to 12 carbon atoms; q is from 1 to 30 on average; x is an integer of 1 to 20; and y is an integer of 5 to 10,000.

$R^1$ in the formulae (1-a) and (1-b) may contain plural groups having different formula weight. When $R^{12}$ is, for example, $C_{13}H_{27}$, the viscosity of the silane coupling agent increases and handling at compounding becomes easy, so that the case is preferred.

More specifically, Si75 and Si69 manufactured by Evonik are suitable as the silane coupling agent (I) represented by the formula (1-a), VPSi363 manufactured by Evonik is suitable as the silane coupling agent (I) represented by the formula (1-b), and NXT-Z and the like manufactured by Momentive are suitable as the silane coupling agent (I) represented by the formula (1-c).

As the silane coupling agent (I) having a carbon-carbon double bond or a carbon-carbon triple bond in the chemical structure, there may be mentioned allyltrimethoxysilane, 9-decenyltrimethoxysilane, trimethoxy-4-vinylphenylsilane, 4-trimethoxysilylphenylacetylene-p-trimethoxysilylphenylacetylene, 1-trimethylsilylmethylthio-1-buten-3-yne, and the like.

The blending amount of the silane coupling agent (I) capable of reacting with the carbon-carbon double bond in the conjugated diene rubber is preferably from 0.5 to 12 parts by mass based on 100 parts by mass of the silica. When the blending amount is less than 0.5 parts by mass, a sufficient coupling effect tends to be not obtained. Even when the agent is used in an amount exceeding 12 parts by mass, the effect is saturated and thus the case is economically not preferable.

[Component (D)]

The silane coupling agent (II) capable of reacting with the group having an active hydrogen for use in the present invention is, for example, a compound having at least one selected from an epoxy group (for example, an oxiranyl group, an oxetanyl group, etc.), a methacryloyloxy group, an acryloyloxy group, a carboxyl group, an isocyanate group, an aldehyde group, and an acyl group.

Specifically, the compound is a compound represented by the following formula (2):

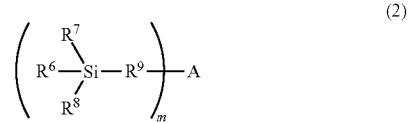

wherein $R^6$ and $R^7$ are the same or different from each other and has the same structure as that of $R^1$ and $R^2$ in the above formulae (1-a) and (1-b); in the case where plurality of $R^8$ groups are present, the $R^8$ groups are the same or different from each other and have the same structure as that of $R^3$ in the above formulae (1-a) and (1-b); in the case where plurality of $R^9$ groups are present, the $R^9$ groups are the same or different from each other and have the same structure as that of $R^4$ in the above formulae (1-a) and (1-b); m is an integer of 1 or 2; A has one or more functional group structures selected from an epoxy group (for example, an oxiranyl group, an oxetanyl group, etc.), a methacryloyloxy group, an acryloyloxy group, a carboxyl group, an isocyanate group, an aldehyde group, and an acyl group.

Examples of A in the formula (2) include 3-glycidoxy group, 3-isocyanate group, 3-methacryloxy group, 3-acryloxy group, and the like.

More specifically, as the silane coupling agent (II) represented by the formula (2), KBM-303, KBM-402, KBM-403, KBE-402, KBE-403, KBE-9007, KBM-502, KBM-503, KBE-502, KBE-503, KBM-5103, and the like manufactured by Shin-Etsu Silicone are suitable.

The blending amount of the silane coupling agent (II) capable of reacting with the group having an active hydrogen is preferably from 0.2 to 7.5 parts by mass based on 100 parts by mass of the silica. When the blending amount is less than 0.2 parts by mass, a sufficient coupling effect tends to be not obtained. Even when the agent is used in an amount exceeding 7.5 parts by mass, the effect is saturated and thus the case is economically not preferable.

The mass ratio of the blending amounts of the silane coupling agent (I) to the silane coupling agent (II) is not particularly limited but is preferably from 4:1 to 1:1.

The total amount of the silane coupling agent (I) and the silane coupling agent (II) is preferably from 1 to 15 parts by mass based on 100 parts by mass of the silica. When the blending amount is less than 1 part by mass, a sufficient coupling effect tends to be not obtained. Even when they are used in an amount exceeding 15 parts by mass, the effect is saturated and thus the case is economically not preferable.

The rubber composition of the present invention can be obtained by mixing (A) a conjugated diene rubber which is obtained by polymerizing a conjugated diene compound or polymerizing a conjugated diene compound and an aromatic vinyl compound and has a group having an active hydrogen and a group capable of chemically binding to a silica, (B) a silica, (C) a silane coupling agent (I) capable of reacting with a carbon-carbon double bond of the conjugated diene in the conjugated diene rubber, and (D) a silane coupling agent (II) capable of reacting with the group having an active hydrogen.

Although the method for mixing the components (A) to (D) is not particularly limited, for example, the following embodiments may be mentioned.

[First Embodiment]

One including (1) a step of mixing the conjugated diene rubber and the silica, (2) a step of mixing the mixture obtained in the step (1) and the silane coupling agent (I), and (3) a step of mixing the mixture obtained in the step (2) and the silane coupling agent (II).

[Second Embodiment]

One including (4) a step of mixing the conjugated diene rubber and the silica, (5) a step of mixing the mixture obtained in the step (4) and the silane coupling agent (II), and (6) a step of mixing the mixture obtained in the step (5) and the silane coupling agent (I).

[Third Embodiment]

One including (7) a step of mixing the conjugated diene rubber and the silica and (8) a step of mixing the mixture obtained in the step (4), the silane coupling agent (I), and the silane coupling agent (II).

[Fourth Embodiment]

One including (9) a step of mixing the conjugated diene rubber and the silica, (10) a step of mixing the silane coupling agent (I) and the silane coupling agent (II), and a step of mixing the mixture obtained in the step (9) and the mixture obtained in the step (10).

[Fifth Embodiment]

One including (11) a step of simultaneously mixing the conjugated diene rubber, the silica, the silane coupling agent (I), and the silane coupling agent (II).

Of these, the third embodiment wherein the conjugated diene rubber and the silica are kneaded in advance and then the silane coupling agent (I) and the silane coupling agent (II) are mixed therewith is preferable.

A portion of the component (A) can be coupled using an arbitrarily usable polyfunctional modifier. Cold flow character is improved by coupling a portion of the component (A) with the polyfunctional modifier. In the case of using the polyfunctional modifier, the order of reacting the polyfunctional modifier is not limited. The coupling reaction may carried out with the polyfunctional modifier and then the conjugated diene polymer, a hydrocarbyloxysilane compound, and the like may be reacted; the hydrocarbyloxysilane compound and the like may be reacted and then the conjugated diene polymer and the polyfunctional modifier may be reacted; or they may be reacted simultaneously.

As the polyfunctional modifier, a compound having one or more functional groups selected from an epoxy group, a carbonyl group, a carboxylate ester group, a carboxylic acid amide group, an acid anhydride group, a phosphate ester group, a phosphite ester group, an epithio group, a thiocarbonyl group, a thiocarboxylate ester group, a dithiocarboxylate ester group, a thiocarboxylic acid amide group, an imino group, an ethyleneimino group, a halogen group, a hydrocarbyloxysilyl group, an isocyanate group, a thioisocyanate group, a conjugated diene group, and an arylvinyl group may be suitably used.

Specifically, examples of the polyfunctional modifier include polyglycidyl ethers of polyhydric alcohols, e.g., ethylene glycol diglycidyl ether and glycerol triglycidyl ether; polyglycidyl ethers of aromatic compounds having two or more phenyl groups, e.g., diglycidylated bisphenol A; polyepoxy compounds such as 1,4-diglycidylbenzene, 1,3,5-triglycidylbenzene, and polyepoxidized liquid polybutadiene; epoxy group-containing tertiary amines such as 4,4'-diglycidyldiphenylmethylamine and 4,4'-diglycidyldibenzylmethylamine; glycidylamino compounds such as diglycidylaniline, diglycidyl-orthotoluidine, tetraglycidyl-metaxylenediamine, tetraglycidylaminodiphenylmethane, tetraglycidyl-p-phenylenediamine, diglycidylaminomethylcyclohexane, and tetraglycidyl-1,3-bisaminomethylcyclohexane; and compounds containing an epoxy group and another functional group, e.g., 3-glycidoxypropyltrimethoxysilane, 3-glycidoxypropyltriethoxysilane, 3-glycidoxypropyltributoxysilane, epoxy-modified silicones, epoxidized soy oil, and epoxidized linseed oil.

In addition to the rubber component, the silica, and the silane goupling agents (I) and (II), the rubber composition of the present invention may be appropriately compounded with a reinforcing agent such as carbon black, a softener such as oil (e.g., extender oil), a silane coupling agent other than the silane coupling agents (I) and (II), wax, an ageing inhibitor, stearic acid, zinc oxide, a vulcanizing agent or crosslinking agent such as sulfur, a vulcanization accleralator, and the like, which are commonly used in the rubber industry. For the compounding of these other components, it is preferable to blend them after kneading the modified rubber for a silica and the silica in advance, as in the case of the silane coupling agents.

The tire of the present invention is produced in a usual manner using the rubber composition of the present invention. Namely, the rubber composition of the present invention compounded with aforementioned various other components according to need is processed by extrusion so as to fit it to the shape of tread at its uncrosslinked (unvulcanized) stage and is molded on a tire molding machine in a usual manner to form an uncrosslinked (unvulcanized) tire. The uncrosslinked (unvulcanized) tire is heated and pressurized in a vulcanizing machine to obtain a tire.

EXAMPLES

Although the present invention is specifically described below based on Examples, the present invention is not limited to these Examples. In Examples and Comparative Examples, "parts" and "%" are indicated on a mass basis unless specifically stated otherwise. The following show measurement methods of various physical property values.

[Styrene unit content (%)]: This was determined by $^1$H-NMR at 500 MHz.

[Vinyl content (%)]: This was determined by $^1$H-NMR at 500 MHz.

[Glass-transition temperature (° C.)]: This was measured in accordance with ASTM D 3418.

[Pre-modification molecular weight]: This was determined in terms of polystyrene from the retention time corresponding to the top of the maximum peak in the GPC curve obtained by gel permeation chromatography (GPC) (HLC-8120GPC (product name (manufactured by Tosoh Corporation))).

(GPC Conditions)

Column: product name "GMHHXL" (manufactured by Tosoh Corporation), two columns

Column temperature: 40° C.

Mobile phase: tetrahydrofuran

Flow rate: 1.0 ml/minute

Sample concentration: 10 mg/20 ml

[Mooney viscosity (ML1+4, 100° C.)]: This was determined in accordance with JIS K 6300 using an L rotor and the following conditions: preheating for 1 minute, rotor running time=4 minutes, temperature=100° C.

[Silane Coupling Agent (I)]

As silane coupling agents represented by the above formula (1-a), the following ones were used.

(a) Silane coupling agent I-1; Si75 manufactured by Evonik

The following shows its chemical formula.

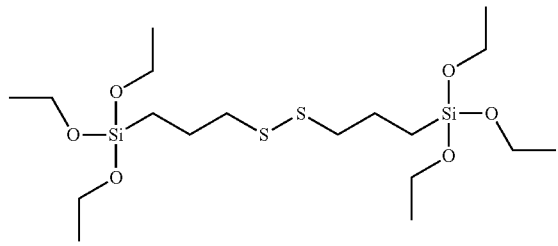 [SMILES: CCO[Si](CCCSSCCC[Si](OCC)(OCC)OCC)(OCC)OCC]

(b) Silane coupling agent I-2; Si69 manufactured by Evonik

The following shows its chemical formula.

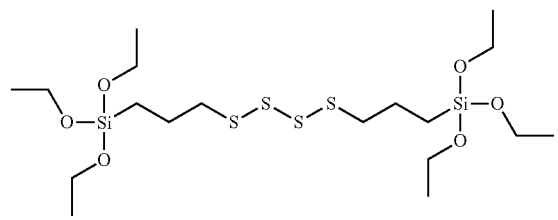 [SMILES: CCO[Si](CCCSSSSCCC[Si](OCC)(OCC)OCC)(OCC)OCC]

As a silane coupling agent represented by the above formula (1-b), the following one was used.

(c) Silane coupling agent I-3; VPSi363 manufactured by Evonik

The following shows its chemical formula.

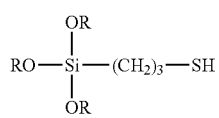

$R = C_{13}H_{27}(OC_2H_4)_n$ or $C_2H_5$

Average content of $C_2H_5 = 33\%$, Average value of $n = 5$

[Silane Coupling Agent (II)]

As silane coupling agents represented by the above formula (2), the following ones were used.

(d) Silane coupling agent II-1; KBE-402 (3-glycidoxypropylmethyldiethoxysilane) manufactured by Shin-Etsu Silicone (e) Silane coupling agent I-2; KBE-403 (3-glycidoxypropyltriethoxysilane) manufactured by Shin-Etsu Silicone (f) Silane coupling agent II-3; KBE-9007 (3-isocyanatopropyltriethoxysilane) manufactured by Shin-Etsu Silicone Example 1

Synthesis of Modified Rubber a for Silica and Evaluation Thereof

Into an autoclave reactor having an inner volume of 5 L wherein the reactor having been substituted with nitrogen, 2,750 g of cyclohexane, 50.0 g of tetrahydrofuran, 125 g of styrene, and 375 g of 1,3-butadiene were charged. The temperature of the reactor contents was adjusted to 10° C. and then a cyclohexane solution containing n-butyllithium (5.80 mmol) was added to initiate polymerization. The polymerization was performed under adiabatic conditions and a maximum temperature reached 85° C.

When the polymerization conversion had reached 99%, polymerization was carried out for an additional 5 minutes, after which 10 g of the polymer solution was sampled out for the measurement of pre-modification molecular weight. Cyclohexane solution containing N,N-bis(trimethylsilyl)aminopropylmethyldiethoxysilane (4.96 mmol) was added and a reaction was carried out for 15 minutes. Then, 2.0 g of 2,6-di-tert-butyl-p-cresol was added to the resulting polymer solution, followed by solvent removal by steam stripping using hot water adjusted to pH=9 with sodium hydroxide. The rubber was dried on a hot roll adjusted to 110° C. to obtain a modified rubber A for a silica.

The polymerization recipe for the modified rubber A for a silica is given in Table 1, while the properties of the obtained modified rubber A for a silica are given in Table 2. A rubber composition prepared using the modified rubber A for a silica, the silane coupling agent I-1, and the silane coupling agent II-1 in accordance with the compounding recipes shown in Tables 3 and 4 was vulcanized and physical property evaluation was performed. The results are shown in Table 4. In this connection, the butadiene rubber in Table 3 corresponds to the aforementioned other rubber component.

Example 2

A rubber composition, which was prepared in accordance with the compounding recipes shown in Tables 3 and 4 in the same manner as in Example 1 except that the silane coupling agent I-2 was used instead of the silane coupling agent I-1 and the silane coupling agent II-2 was used instead of the silane coupling agent II-1, was vulcanized and physical property evaluation was performed. The results are shown in Table 4.

Example 3

A rubber composition, which was prepared in accordance with the compounding recipes shown in Tables 3 and 4 in the same manner as in Example 1 except that the silane coupling agent I-3 was used instead of the silane coupling agent I-1 and the silane coupling agent II-2 was used instead of the silane coupling agent II-1, was vulcanized and physical property evaluation was performed. The results are shown in Table 4.

Example 4

Synthesis of Modified Rubber B for Silica and Evaluation Thereof

A modified rubber B for a silica was obtained in the same manner as in Example 1 except that N-trimethylsilyl-N-methylaminopropylmethyldiethoxysilane (4.96 mmol) was used instead of N,N-bis(trimethylsilyl)aminopropylmethyldiethoxysilane (4.96 mmol).

The polymerization recipe for the modified rubber B for a silica is given in Table 1, while the properties of the obtained modified rubber B for a silica are given in Table 2. A rubber composition prepared using the modified rubber B for a silica, the silane coupling agent I-2, and the silane coupling agent II-3 in accordance with the compounding recipes shown in Tables 3 and 4 was vulcanized and physical property evaluation was performed. The results are shown in Table 4.

Example 5

A rubber composition, which was prepared in accordance with the compounding recipes shown in Tables 3 and 4 in the same manner as in Example 4 except that the silane coupling agent I-1 was used instead of the silane coupling agent I-2 and the silane coupling agent II-1 was used instead of the silane coupling agent II-3, was vulcanized and physical property evaluation was performed. The results are shown in Table 4.

Example 6

Synthesis of Modified Rubber C for Silica and Evaluation Thereof

A modified rubber C for a silica was obtained in the same manner as in Example 1 except that 3-(4-trimethylsilyl-1-piperazino)propyltriethoxysilane (4.96 mmol) was used instead of N,N-bis(trimethylsilyl)aminopropylmethyldiethoxysilane (4.96 mmol).

The polymerization recipe for the modified rubber C for a silica is shown in Table 1, while the properties of the obtained modified rubber C for a silica are shown in Table 2. A rubber composition prepared using the modified rubber C for a silica, the silane coupling agent I-1, and the silane coupling agent II-1 in accordance with the compounding recipes shown in Tables 3 and 4 was vulcanized and physical property evaluation was performed. The results are shown in Table 4.

Example 7

Synthesis of Modified Rubber D for Silica and Evaluation Thereof

A modified rubber D for a silica was obtained in the same manner as in Example 1 except that N,N',N'-tris(trimethylsilyl)-N-(2-aminoethyl)-3-aminopropyltriethoxysilane (4.96 mmol) was used instead of N,N-bis(trimethylsilyl)aminopropylmethyldiethoxysilane (4.96 mmol).

The polymerization recipe for the modified rubber D for a silica is shown in Table 1, while the properties of the obtained modified rubber D for a silica are shown in Table 2. A rubber composition prepared using the modified rubber D for a silica, the silane coupling agent I-1, and the silane coupling agent II-1 in accordance with the compounding recipes shown in Tables 3 and 4 was vulcanized and physical property evaluation was performed. The results are shown in Table 4.

Example 8

Synthesis of Modified Rubber E for Silica and Evaluation Thereof

A modified rubber E for a silica was obtained in the same manner as in Example 1 except that S-trimethylsilylmercaptopropylmethyldiethoxysilane (4.96 mmol) was used instead of N,N-bis(trimethylsilyl)aminopropylmethyldiethoxysilane (4.96 mmol).

The polymerization recipe for the modified rubber E for a silica is shown in Table 1, while the properties of the obtained modified rubber E for a silica are shown in Table 2. A rubber composition prepared by using the modified rubber E for a silica, the silane coupling agent I-1, and the silane coupling agent II-1 in accordance with the compounding recipes shown in Tables 3 and 4 was vulcanized and physical property evaluation was performed. The results are shown in Table 4.

Example 9

Synthesis of Modified Rubber F for Silica and Evaluation Thereof

A modified rubber F for a silica was obtained in the same manner as in Example 1 except that a cyclohexane solution containing silicon tetrachloride (2.69 mmol) was added and mixing was performed for 5 minutes before the addition of 2,6-di-tert-butyl-p-cresol.

The polymerization recipe for the modified rubber F for a silica is shown in Table 1, while the properties of the obtained modified rubber F for a silica are shown in Table 2. A rubber composition prepared using the modified rubber F for a silica, the silane coupling agent I-1, and the silane coupling agent II-1 in accordance with the compounding recipe shown in Tables 3 and 4 was vulcanized and physical property evaluation was performed. The results are shown in Table 4.

Example 10

Synthesis of Modified Rubber G for Silica and Evaluation Thereof

A modified rubber G for a silica was obtained in the same manner as in Example 1 except that tetraethoxysilane (4.96 mmol) was used instead of N,N-bis(trimethylsilyl)aminopropylmethyldiethoxysilane (4.96 mmol).

The polymerization recipe for the modified rubber G for a silica is shown in Table 1, while the properties of the obtained modified rubber G for a silica are shown in Table 2.

After mixing the modified rubber A for a silica and the modified rubber G for a silica in a ratio of 5:5 as a mass ratio, a rubber composition prepared using the silane coupling agent I-1 and the silane coupling agent II-1 in accordance with the compounding recipes shown in Tables 3 and 4 was vulcanized and physical property evaluation was performed. The results are shown in Table 4.

Example 11

Synthesis of Modified Rubber H for Silica and Evaluation Thereof

A modified rubber H for a silica was obtained in the same manner as in Example 1 except that N-trimethylsilylbenzaldehydeimine (4.96 mmol) was used instead of N,N-bis(trimethylsilyl)aminopropylmethyldiethoxysilane (4.96 mmol).

The polymerization recipe for the modified rubber H for a silica is shown in Table 1, while the properties of the obtained modified rubber H for a silica are shown in Table 2. A rubber composition prepared by using the modified rubber H for a silica, the silane coupling agent I-1, and the silane coupling agent II-1 in accordance with the compounding recipes shown in Tables 3 and 4 was vulcanized and physical property evaluation was performed. The results are shown in Table 4.

Comparative Example 1

A rubber composition prepared in the same manner as in Example 1 except that only the silane coupling agent I-1 was used instead of the silane coupling agent I-1 and the silane coupling agent II-1 compounded in Example 1 was vulcanized and physical property evaluation was performed. The results are shown in Table 4.

Comparative Example 2

A rubber composition prepared in the same manner as in Example 4 except that only the silane coupling agent I-2 was used instead of the silane coupling agent I-2 and the silane coupling agent II-3 compounded in Example 4 was vulcanized and physical property evaluation was performed. The results are shown in Table 4.

Comparative Example 3

A rubber composition prepared in the same manner as in Example 3 except that only the silane coupling agent I-3 was used instead of the silane coupling agent I-3 and the silane coupling agent II-2 compounded in Example 3 was vulcanized and physical property evaluation was performed. The results are shown in Table 4.

Comparative Example 4

A rubber composition prepared in the same manner as in Example 1 except that only the silane coupling agent II-1 was used instead of the silane coupling agent I-1 and the silane coupling agent II-1 compounded in Example 1 was vulcanized and physical property evaluation was performed. The results are shown in Table 4.

Comparative Example 5

A rubber composition prepared in the same manner as in Example 3 except that only the silane coupling agent II-2 was used instead of the silane coupling agent I-3 and the silane coupling agent II-2 compounded in Example 3 was vulcanized and physical property evaluation was performed. The results are shown in Table 4.

Comparative Example 6

A rubber composition prepared in the same manner as in Example 4 except that only the silane coupling agent II-3 was used instead of the silane coupling agent I-2 and the silane coupling agent II-3 compounded in Example 4 was vulcanized and physical property evaluation was performed. The results are shown in Table 4.

Comparative Example 7

A rubber composition prepared by using the modified rubber G for a silica, the silane coupling agent I-1, and the silane coupling agent II-1 in accordance with the compounding recipe given in Tables 3 and 4 was vulcanized and physical property evaluation was performed. The results are shown in Table 4.

Comparative Example 8

A rubber composition prepared by using the modified rubber G for a silica and the silane coupling agent I-1 in accordance with the compounding recipes shown in Tables 3 and 4 was vulcanized and physical property evaluation was performed. The results are shown in Table 4.

TABLE 1

| Polymerization recipe | | Kinds of modified rubber for silica | | | | | | | |
|---|---|---|---|---|---|---|---|---|---|
| | | A | B | C | D | E | F | G | H |
| Solvent | | | | | | | | | |
| cyclohexane | (g) | 2750 | 2750 | 2750 | 2750 | 2750 | 2750 | 2750 | 2750 |
| Vinyl content regulator | | | | | | | | | |
| tetrahydrofuran | (g) | 50.0 | 50.0 | 50.0 | 50.0 | 50.0 | 50.0 | 50.0 | 50.0 |
| Polymerization monomer | | | | | | | | | |
| styrene | (g) | 125 | 125 | 125 | 125 | 125 | 125 | 125 | 125 |
| butadiene | (g) | 375 | 375 | 375 | 375 | 375 | 375 | 375 | 375 |
| Polymerization initiator | | | | | | | | | |
| n-butyllithium | (mmol) | 5.80 | 5.80 | 5.80 | 5.80 | 5.80 | 5.80 | 5.80 | 5.80 |
| Modifier | | | | | | | | | |
| Mod-A | (mmol) | 4.96 | — | — | — | — | 4.96 | — | — |
| Mod-B | (mmol) | — | 4.96 | — | — | — | — | — | — |
| Mod-C | (mmol) | — | — | 4.96 | — | — | — | — | — |
| Mod-D | (mmol) | — | — | — | 4.96 | — | — | — | — |
| Mod-E | (mmol) | — | — | — | — | 4.96 | — | — | — |
| Mod-G | (mmol) | — | — | — | — | — | — | 4.96 | — |
| Mod-H | (mmol) | — | — | — | — | — | — | — | 4.96 |
| Silicon tetrachloride | (mmol) | — | — | — | — | — | 2.69 | — | — |

Mod-A N,N-bis(trimethylsilyl)aminopropylmethyldiethoxysilane
Mod-B N-trimethylsilyl-N-methylaminopropylmethyldiethoxysilane
Mod-C 3-(4-trimethylsilyl-1-piperazino)propyltriethoxysilane
Mod-D N,N',N'-tris(trimethylsilyl)-N-(2-aminoethyl)-3-aminopropyltriethoxysilane
Mod-E S-trimethylsilylmercaptopropylmethyldiethoxysilane
Mod-G tetraethoxysilane
Mod-H N-trimethylsilylbenzaldehydeimine

TABLE 2

| [Properties of modified rubber for silica] | Kinds of modified rubber for silica | | | | | | | |
|---|---|---|---|---|---|---|---|---|
| | A | B | C | D | E | F | G | H |
| Styrene unit content (% by mass) | 25 | 25 | 25 | 25 | 25 | 25 | 26 | 25 |
| Vinyl content (%) | 56 | 56 | 55 | 54 | 55 | 56 | 54 | 55 |
| Glass-transition temperature (° C.) | −30 | −31 | −31 | −30 | −30 | −30 | −29 | −30 |
| Weight-average molecular weight before modification (×10$^4$) | 20 | 20 | 20 | 20 | 20 | 20 | 21 | 21 |
| Mooney viscosity (ML1 + 4, 100° C.) | 8 | 7 | 28 | 24 | 8 | 65 | 70 | 10 |

TABLE 3

| Component | phr |
|---|---|
| Component (A) (modified rubber for silica) | 70 |
| Butadiene rubber *1) | 30 |
| Component (B) (silica *2)) | 70 |
| Components (C), (D) (total amount of silane coupling agents) | 5.6 |
| Extender oil *3) | 37.5 |
| Carbon black *4) | 5.6 |
| Stearic acid | 2.0 |
| Aging inhibitor *5) | 1.0 |
| Zinc oxide | 3.0 |
| Vulcanization accelelator CZ *6) | 1.8 |
| Vulcanization accelelator D *7) | 1.5 |
| Sulfur | 1.5 |

*1) BR01 manufactured by JSR Corporation
*2) Nipsil AQ manufactured by Tosoh Silica Corporation
*3) SNH46 manufactured by Sankyo Yuka Kogyo K.K.
*4) Diablack N339 manufactured by Mitsubishi Chemical Corporation
*5) Nokrack 810NA manufactured by Ouchi Shinko Chemical Industry Co., Ltd.
*6) Nokselar CZ manufactured by Ouchi Shinko Chemical Industry Co., Ltd.
*7) Nokselar D manufactured by Ouchi Shinko Chemical Industry Co., Ltd.

TABLE 4

| | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Kinds of modified rubber for silica | A | A | A | B | B | C | D | E | F | A:G = 5:5 (mass ratio) |
| Silane coupling agent (I) | I-1 | I-2 | I-3 | I-2 | I-1 | I-1 | I-1 | I-1 | I-1 | I-1 |
| phr | 4.0 | 4.0 | 4.0 | 4.0 | 4.0 | 4.0 | 4.0 | 4.0 | 4.0 | 4.0 |
| Silane coupling agent (II) | II-1 | II-2 | II-2 | II-3 | II-1 | II-1 | II-1 | II-1 | II-1 | II-1 |
| phr | 1.6 | 1.6 | 1.6 | 1.6 | 1.6 | 1.6 | 1.6 | 1.6 | 1.6 | 1.6 |
| [Physical properties of cross-linked rubber composition] | | | | | | | | | | |
| Mooney viscosity (NL1 + 4, 100° C.) | 74 | 76 | 81 | 66 | 68 | 69 | 77 | 71 | 78 | 67 |
| Tensile strength (index) | 113 | 111 | 121 | 111 | 112 | 113 | 114 | 111 | 113 | 112 |
| 0° C. tanδ (index) | 121 | 118 | 131 | 115 | 113 | 114 | 123 | 118 | 120 | 113 |
| 70° C. tanδ (index) | 122 | 124 | 135 | 110 | 111 | 116 | 125 | 121 | 118 | 116 |
| Abrasion resistance (index) | 123 | 125 | 118 | 115 | 114 | 111 | 122 | 119 | 116 | 113 |
| Δ based on Comparative Example 1 | | | | | | | | | | |
| Tensile strength | 3 | 1 | 11 | 1 | 2 | 3 | 4 | 1 | 3 | 2 |
| 0° C. tanδ | 13 | 10 | 23 | 7 | 5 | 6 | 15 | 10 | 12 | 5 |
| 70° C. tanδ | 13 | 15 | 26 | 1 | 2 | 7 | 16 | 12 | 9 | 7 |
| Abrasion resistance | 16 | 18 | 11 | 8 | 7 | 4 | 15 | 12 | 9 | 6 |
| Δ based on Comparative Example 8 | | | | | | | | | | |
| Tensile strength | | | | | | | | | | |
| 0° C. tanδ | | | | | | | | | | |
| 70° C. tanδ | | | | | | | | | | |
| Abrasion resistance | | | | | | | | | | |

| | Ex. 11 | Com. Ex. 1 | Com. Ex. 2 | Com. Ex. 3 | Com. Ex. 4 | Com. Ex. 5 | Com. Ex. 6 | Com. Ex. 7 | Com. Ex. 8 |
|---|---|---|---|---|---|---|---|---|---|
| Kinds of modified rubber for silica | H | A | B | A | A | A | B | G | G |
| Silane coupling agent (I) | I-1 | I-1 | I-2 | I-3 | | | | I-1 | I-1 |
| phr | 4.0 | 5.6 | 5.6 | 5.6 | | | | 4.0 | 5.6 |
| Silane coupling agent (II) | II-1 | | | | II-1 | II-2 | II-3 | II-1 | |
| phr | 1.6 | | | | 5.6 | 5.6 | 5.6 | 1.6 | |
| [Physical properties of cross-linked rubber composition] | | | | | | | | | |
| Mooney viscosity (NL1 + 4, 100° C.) | 72 | 77 | 65 | 72 | 69 | 75 | 68 | 59 | 62 |
| Tensile strength (index) | 112 | 110 | 108 | 110 | 106 | 104 | 103 | 90 | 100 |
| 0° C. tanδ (index) | 111 | 108 | 105 | 105 | 112 | 110 | 109 | 105 | 100 |

TABLE 4-continued

| | | | | | | | | | | |
|---|---|---|---|---|---|---|---|---|---|---|
| 70° C. tanδ | (index) | 111 | 109 | 107 | 104 | 111 | 108 | 109 | 94 | 100 |
| Abrasion resistance | (index) | 110 | 107 | 108 | 110 | 87 | 91 | 98 | 94 | 100 |
| Δ based on Comparative Example 1 | | | | | | | | | | |
| Tensile strength | | 2 | 0 | −2 | 0 | −4 | −6 | −7 | | |
| 0° C. tanδ | | 3 | 0 | −3 | −3 | 4 | 2 | 1 | | |
| 70° C. tanδ | | 2 | 0 | −2 | −5 | 2 | −1 | 0 | | |
| Abrasion resistance | | 3 | 0 | 1 | 3 | −20 | −16 | −9 | | |
| Δ based on Comparative Example 8 | | | | | | | | | | |
| Tensile strength | | | | | | | | | −10 | 0 |
| 0° C. tanδ | | | | | | | | | 5 | 0 |
| 70° C. tanδ | | | | | | | | | −6 | 0 |
| Abrasion resistance | | | | | | | | | −6 | 0 |

In Table 4, Ex. means Example and Com. Ex. means Comparative Example.

[Kneading Method of Rubber Composition and Property Evaluation]

Using a Plastomill (capacity of 250 cc) equipped with a temperature control device, the modified rubber for a silica of the present invention, butadiene rubber, extender oil, carbon black, a silica, silane coupling agent(s), stearic acid, an aging inhibitor, and zinc white were kneaded in a first-stage kneading under conditions of a fill rate of 72% and a rotation number of 60 rpm. Then, after the blend obtained in the above was cooled to room temperature, sulfur and a vulcanization accelerator were kneaded in a second-stage kneading. This was molded and vulcanized with a vulcanization press for a prescribed period of time at 160° C. and the following property evaluations, which are indicative of tire performance, were carried out.

(i) Mooney viscosity: The pre-vulcanized rubber composition was used as the measurement sample and measurement was performed in accordance with JIS K 6300 using an L rotor under the following conditions: preheating for 1 minute, rotor running time=4 minutes, and temperature=100° C.

(ii) Tensile strength: The 300% modulus was measured according to JIS K 6301. This is reported as an index, wherein a larger numerical value indicates a higher tensile strength and thus is better.

(iii) 0° C. tan δ: The vulcanized rubber was used as the measurement sample. The measurement was carried out under conditions of a tensile dynamic strain of 0.14%, an angular velocity of 100 radians per second, and 0° C. with using a dynamic spectrometer (manufactured by Rheometrics (USA)). This is reported as an index, wherein a larger numerical value indicates a higher wet skid resistance and thus is better.

(iv) 70° C. tan δ: The vulcanized rubber was used as the measurement sample. The measurement was carried out under conditions of a tensile dynamic strain of 0.7%, an angular velocity of 100 radians per second, and 70° C. with using a dynamic spectrometer (manufactured by Rheometrics (USA)). This is reported as an index, wherein a larger numerical value indicates a smaller low hysteresis character and thus is better.

(v) Abrasion resistance: The vulcanized rubber was used as the measurement sample. The measurement was performed at 25° C. with a load of 10 N in accordance with JIS K 6264 and with using a DIN abrasion tester (manufactured by Toyo Seiki Seisaku-sho, Ltd.). This is reported as an index, wherein a larger numerical value indicates a better abrasion resistance.

As is clear from Table 4, the compositions using the modified rubber for a silica of the present invention and two kinds of silane coupling agents are shown to have a remarkably improved balance between the wet skid resistance and the low hysteresis character, without impairing the tensile strength or abrasion resistance.

From the results of the physical property evaluations of Example 1 and Comparative Examples 1 and 4, Example 3 and Comparative Examples 3 and 5, and Example 4 and Comparative Examples 2 and 6, it can be confirmed that the combined use of the silane coupling agent (I) and the silane coupling agent (II) of the present invention is important for improving the balance of the tensile strength, the abrasion resistance, the wet skid resistance, and the low hysteresis character. Moreover, from the results of the physical property evaluations of Comparative Examples 7 and 8, it can be confirmed that the effect of the combined use of the silane coupling agent (I) and the silane coupling agent (II) of the present invention appears only at the time of using the conjugated diene rubber which is obtained by polymerizing a conjugated diene compound or polymerizing a conjugated diene compound and an aromatic vinyl compound and has a group having an active hydrogen and a group capable of chemically binding to a silica.

The invention claimed is:

1. A rubber composition, comprising:
   (A) a conjugated diene rubber which is obtained by polymerizing a conjugated diene compound or polymerizing a conjugated diene compound and an aromatic vinyl compound, the conjugated diene rubber comprising a group comprising an active hydrogen and a group capable of chemically binding to silica;
   (B) a silica;
   (C) a silane coupling agent (I) capable of reacting with a carbon-carbon double bond of the conjugated diene in the conjugated diene rubber; and
   (D) a silane coupling agent (II) capable of reacting with the group comprising an active hydrogen;
   wherein the group comprising an active hydrogen comprises at least one of a primary amino group, a secondary amino group, an imino group, a primary phosphino group, a secondary phosphino group, and a thiol group.

2. A method for producing the rubber composition of claim 1, the method comprising mixing the conjugated diene rubber (A), the silica (B), the silane coupling agent (C) and the silane coupling agent (D), to form a rubber composition.

3. The method according to claim 2, wherein the component (C) comprises at least one selected from the group consisting of sulfur, a carbon-carbon double bond, and a carbon-carbon triple bond.

4. The method according to claim 2, wherein the group capable of reacting with the group comprising an active hydrogen in the component (D) comprises at least one selected from the group consisting of an epoxy group, a methacryloyloxy group, an acryloyloxy group, a carboxyl group, an isocyanate group, an aldehyde group, and an acyl group.

5. The method according claim 2, wherein the component (A) further comprises at least one selected from the group consisting of a tertiary amino group, a tertiary phosphino group, and a pyridyl group.

6. The method according to claim 5, wherein the component (A) comprises an onium structure formed from at least one selected from the group consisting of a primary amino group, a secondary amino group, a tertiary amino group, an imino group, a pyridyl group, a primary phosphino group, a secondary phosphino group, a tertiary phosphino group, and a thiol group.

7. The method according to claim 2, wherein the group capable of chemically binding to a silica in the component (A) is a hydrocarbyloxysilyl group or a silanol group.

8. The method according to claim 2, wherein the component (C) is at least one selected from the group consisting of compounds represented by the following formulae (1-a) to (1-c):

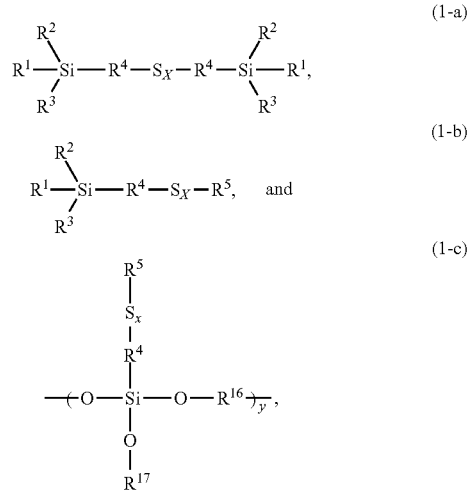

wherein:
R$^1$ and R$^2$ independently represent a group represented by R$^{10}$O— or an alkylpolyether group represented by —O—(R$^{11}$—O)$_n$—R$^{12}$;
R$^{10}$ is a hydrogen atom, a monovalent hydrocarbon group having 1 to 30 carbon atoms, or a group represented by (R$^{13}$)$_3$SiR$^{14}$;
R$^{13}$ is an alkyl group or alkenyl group having 1 to 30 carbon atoms;
R$^{14}$ is a divalent hydrocarbon group having 1 to 30 carbon atoms;
R$^{11}$ independently represents a divalent hydrocarbon group having 1 to 30 carbon atoms;
n is from 1 to 30;
R$^{12}$ is a monovalent hydrocarbon group having at least 3 carbon atoms;
R$^3$ independently represents a group represented by R$^{10}$O— or a monovalent hydrocarbon group having 1 to 30 carbon atoms;
R$^4$ independently represents a divalent hydrocarbon group having 1 to 30 carbon atoms;
R$^5$ is a hydrogen atom, a monovalent hydrocarbon group having 1 to 30 carbon atoms, a group represented by —CN, or a group represented by —(C=O)-R$^{15}$;
R$^{15}$ is a monovalent hydrocarbon group having 1 to 30 carbon atoms;
R$^{16}$ is a group represented by the formula: —(R$^{18}$—O)$_p$—R$^{19}$;
R$^{18}$ and R$^{19}$ independently represent a divalent hydrocarbon group having 1 to 12 carbon atoms;
p is from 0 to 30 in average;
R$^{17}$ is a monovalent hydrocarbon group having 1 to 12 carbon atoms, a formula —(R$^{20}$—O)$_q$—H, or a binding group —(R$^{21}$—O)$_{q-1}$—R$^{22}$ obtained by dehydrative condensation of —(R$^{20}$—O)$_q$—H;
R$^{20}$ and R$^{21}$ independently represent a divalent hydrocarbon group having 1 to 12 carbon atoms;
R$^{22}$ is a divalent hydrocarbon group having 1 to 12 carbon atoms;
q is from 1 to 30 in average;
x is an integer of 1 to 20; and
y is an integer of 5 to 10,000.

9. The method according to claim 2, wherein the component (D) is a compound represented by formula (2):

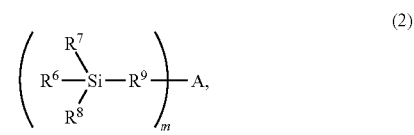

wherein:
R$^6$ and R$^7$ independently represent a group represented by R$^{10}$O— or an alkylpolyether group represented by the formula: —O—(R$^{11}$—O)$_n$—R$^{12}$;
R$^{10}$ is a hydrogen atom, a monovalent hydrocarbon group having 1 to 30 carbon atoms, or a group represented by: (R$^{13}$)$_3$SiR$^{14}$;
R$^{13}$ is an alkyl group or alkenyl group having 1 to 30 carbon atoms;
R$^{14}$ is a divalent hydrocarbon group having 1 to 30 carbon atoms;
R$^{11}$ independently represents a divalent hydrocarbon group having 1 to 30 carbon atoms;
n is from 1 to 30;
R$^{12}$ is a monovalent hydrocarbon group having at least 3 carbon atoms;
R$^8$ independently represents a group represented by R$^{10}$O— or a monovalent hydrocarbon group having 1 to 30 carbon atoms;
R$^9$ independently represents a divalent hydrocarbon group having 1 to 30 carbon atoms;
m is an integer of 1 or 2; and
A comprises one or more functional group structures selected from the group consisting of an epoxy group, a methacryloyloxy group, an acryloylaxy group, a carboxyl group, an isocyanate group, an aldehyde group, and an acyl group.

10. A rubber composition obtained by the method according to claim 2.

11. A tire obtained by crosslinking and molding the rubber composition according to claim 10.

* * * * *